United States Patent [19]
Pozzoli

[11] Patent Number: 6,109,432
[45] Date of Patent: Aug. 29, 2000

[54] PACKAGE FOR COMPACT DISCS AND THE LIKE PROVIDED WITH AN INTEGRATED BOOKLET

[75] Inventor: Aldo Pozzoli, Inzago, Italy

[73] Assignee: Pozzoli S.p.A., Inzago, Italy

[21] Appl. No.: 09/384,970

[22] Filed: Aug. 30, 1999

[51] Int. Cl.[7] .................................................. B65D 85/57
[52] U.S. Cl. ....................................... 206/232; 206/308.1
[58] Field of Search ............................... 206/232, 308.1, 206/308.2, 312, 472

[56] References Cited

U.S. PATENT DOCUMENTS

| | | |
|---|---|---|
| 5,370,224 | 12/1994 | Fujio et al. . |
| 5,472,083 | 12/1995 | Robinson et al. ................. 206/308.1 |
| 5,513,749 | 5/1996 | Simmons . |
| 5,522,500 | 6/1996 | Mori ................................... 206/308.1 |
| 5,669,491 | 9/1997 | Pettey ................................... 206/232 |
| 5,743,390 | 4/1998 | Pozzoli ................................. 206/232 |
| 5,775,490 | 7/1998 | Baker et al. ......................... 206/308.1 |
| 5,775,491 | 7/1998 | Taniyama ............................ 206/308.1 |
| 5,833,063 | 11/1998 | Ho ........................................ 206/308.1 |

*Primary Examiner*—Jim Foster
*Attorney, Agent, or Firm*—Guido Modiano; Albert Josif; Daniel O'Byrne

[57] ABSTRACT

A package for compact discs and the like with integrated booklet, comprising a booklet-like body provided with a plurality of stacked sheet which are joined at one edge and with a pocket for containing a compact disc, characterized in that said pocket has, on the side that lies opposite to the open edge of the pocket, a central opening, the distance between said open edge and said opposite side being smaller than the diameter of the compact disc.

6 Claims, 2 Drawing Sheets

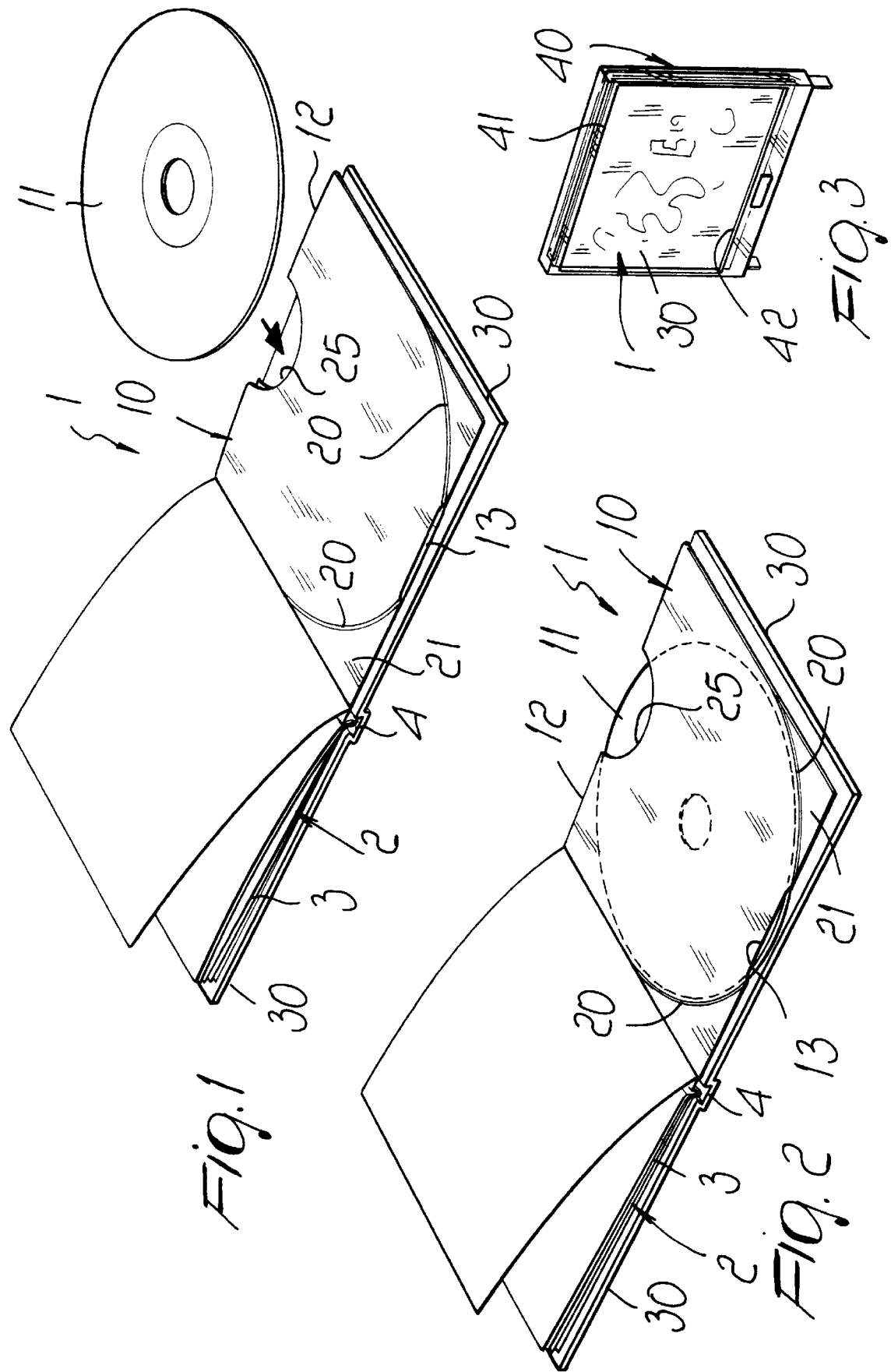

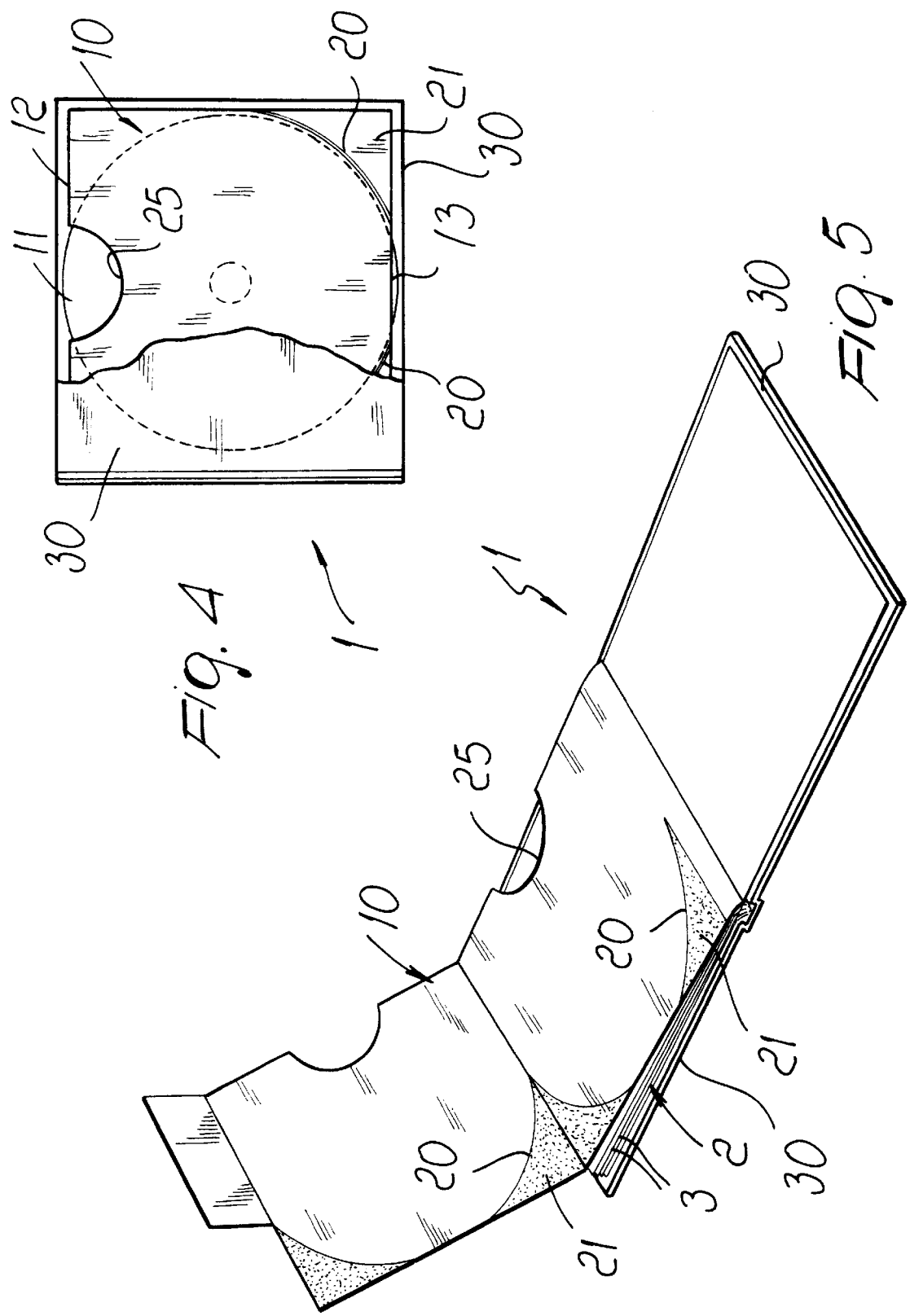

PACKAGE FOR COMPACT DISCS AND THE LIKE PROVIDED WITH AN INTEGRATED BOOKLET

BACKGROUND OF THE INVENTION

The present invention relates to a package for compact discs and the like provided with an integrated booklet.

It is known that anti-theft devices for compact discs are already commercially available which are constituted in practice by a frame which forms an opening in which one long side is longer than the longest dimension of a conventional jewel case for compact discs and one short side is shorter than the short side of the case.

Inside the frame there is provided a shim which, when removed for example by magnetic action, allows to insert or remove the case by inclining it with respect to the frame and which, when it is in the insertion position, prevents the oscillation of the container and accordingly prevents its extraction.

Such anti-theft devices, which are normally used for conventional compact disc cases, cannot be used for packages formed by means of a booklet which has, generally at its last page, a pocket or envelope in which the compact disc can be inserted, because said pocket necessarily has dimensions which force the booklet and its cover to have overall dimensions which are larger than the short side of the opening of the anti-theft device.

Accordingly, in the current state of the art, compact disc packages that include a booklet in which a compact disc insertion pocket is provided cannot be accommodated in conventional anti-theft devices.

SUMMARY OF THE INVENTION

The aim of the present invention is to solve the above problem by providing a package for compact discs and the like with integrated booklet which can be inserted in conventional anti-theft devices because it is produced with solutions which allow to reduce the dimensions of the short side of the package.

Within the scope of this aim, a particular object of the present invention is to provide a package which allows to produce a pocket which allows correct containment of the compact disc, preventing damage thereto.

Another object of the present invention is to provide a package for compact discs which by virtue of its particular constructive characteristics is capable of giving the greatest assurances of reliability and safety in use.

Another object of the present invention is to provide a package for compact discs and the like with integrated booklet which can be easily obtained starting from commonly commercially available elements and materials and is also competitive from a purely economical point of view.

This aim, these objects and others which will become apparent hereinafter are achieved by a package for compact discs and the like with integrated booklet, according to the invention, which comprises a booklet-like body provided with a plurality of stacked sheets which are joined at one edge and with a pocket for containing a compact disc, characterized in that said pocket has, on the side that lies opposite to the open edge of the pocket, a central opening, the distance between said open edge and said opposite side being smaller than the diameter of the compact disc.

BRIEF DESCRIPTION OF THE DRAWINGS

Further characteristics and advantages of the present invention will become apparent from the following detailed description of a package for compact discs and the like with integrated booklet, illustrated only by way of non-limitative example in the accompanying drawings, wherein:

FIG. 1 is a schematic perspective view of the package for compact discs according to the invention, with the disc in extracted position;

FIG. 2 is a perspective view of the package with the disc inserted;

FIG. 3 is a schematic perspective view of the package inserted in an anti-theft device;

FIG. 4 is a schematic and partially cutout plan view of the package according to the invention; and FIG. 5 is a perspective view of the package according to the invention, with the pocket shown in exploded view to clearly illustrate its configuration.

DESCRIPTION OF THE PREFERRED EMBODIMENTS

With reference to the above figures, the package for compact discs and the like according to the invention, generally designated by the reference numeral 1, comprises a booklet-like body 2 which is formed by a plurality of stacked sheets 3 which are joined at a spine 4.

The booklet is completed by a pocket 10 for containing a compact disc 11.

The pocket 10 has an open edge 12 provided at the upper edge of the booklet in order to allow the insertion of the compact disc in the pocket, and on the opposite side with respect to the open edge 12 a central opening 13 is provided which allows a portion of the compact disc to protrude externally. The distance between the edge on which the central opening 13 is provided and the open edge 12 is less than the diameter of the compact disc 11, which is arranged so that it protrudes by a short extent both in the upper region and in the lower region of the pocket 10.

In order to delimit and properly contain the compact disc 11 there are, in the lower part directed toward the edge that forms the opening 13, semicircular perforation lines 20 which delimit the seat for accommodating the disc and further delimit corner regions 21 where glue is present for joining the two faces of the pocket, which are delimited in practice by the opening 13.

The presence of the perforation lines 20 prevents the disc from making contact with the glue and accordingly possibly suffering damage.

Conventional cutouts 25 are further provided at the edge 12 and facilitate grip for removing the disc.

The assembly is completed by a rigid cover 30, whose dimensions are such as to contain the disc 11, which protrudes with respect to the stack of sheets but is contained within the dimensions of the cover 30.

The above-described structure has the particularity of having a pocket which, by being provided with the central opening, allows the disc to protrude slightly, so that it is possible to produce a package in which the dimensions of the cover are substantially identical to the conventional dimensions of compact disc cases; accordingly, the above-described booklet-like package can be easily inserted in anti-theft devices of the type generally designated by the reference numeral 40 provided with a frame 41 which delimits the opening 42, as shown in FIG. 3; likewise, the package thus formed can be inserted in conventional display stands.

From the above description it is thus evident that the invention achieves the intended aim and objects, and in particular the fact is stressed that the provision of glued corner regions delimited by a central opening allows to use conventional binding techniques which entail edge trimming, allowing to contain the space occupation by an extent which is sufficient to allow to insert the booklet in the anti-theft device.

Moreover, the presence of the perforation lines 20 allows to provide, inside the pocket, a seat for accommodating the disc, which accordingly does not make contact with the glues used in the corner elements 21, preventing damage to the disc.

In practice, the materials used, so long as they are compatible with the specific use, as well as the contingent shapes and dimensions, may be any according to requirements.

What is claimed is:

1. A package for compact discs with integrated booklet, comprising a booklet-like body provided with a plurality of stacked sheets which are joined at one edge and with a pocket for containing a compact disc, wherein said pocket has, on the side that lies opposite to the open edge of the pocket, a central opening, the distance between said open edge and said opposite side being smaller than the diameter of the compact disc.

2. The package according to claim 1, wherein said compact disc protrudes from said central opening.

3. The package according to claim 1, wherein it comprises, to the side of said central opening, corner regions in which the faces of said pocket are mutually glued, said regions delimiting a seat for accommodating said compact disc.

4. The package according to claim 3, wherein said corner regions are delimited by semicircular perforation lines which form said seat for accommodating said compact disc.

5. The package according to claim 1, wherein it comprises a cover which can be applied to said booklet and protrudes with respect to said compact disc.

6. The package for compact discs with integrated booklet as claimed in claim 1, wherein it can be inserted in an anti-theft device having a frame with an insertion opening.

* * * * *